US012669957B2

(12) United States Patent
Helmick et al.

(10) Patent No.: US 12,669,957 B2
(45) Date of Patent: Jun. 30, 2026

(54) SYSTEMS, METHODS, AND APPARATUS FOR USING A SUBMISSION QUEUE FOR WRITE BUFFER UTILIZATION

(71) Applicant: Samsung Electronics Co., Ltd., Suwon-si (KR)

(72) Inventors: Daniel Lee Helmick, Thornton, CO (US); Robert Wayne Moss, Fort Collins, CO (US); Mark Allen Gaertner, Fort Myers, FL (US); Siamak Arya, Cupertino, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/652,805

(22) Filed: May 1, 2024

(65) Prior Publication Data

US 2024/0385774 A1      Nov. 21, 2024

Related U.S. Application Data

(60) Provisional application No. 63/467,917, filed on May 19, 2023.

(51) Int. Cl.
*G06F 3/06* (2006.01)

(52) U.S. Cl.
CPC .......... *G06F 3/0656* (2013.01); *G06F 3/0604* (2013.01); *G06F 3/0659* (2013.01); *G06F 3/0673* (2013.01)

(58) Field of Classification Search
CPC .... G06F 3/0656; G06F 3/0604; G06F 3/0659; G06F 3/0673
See application file for complete search history.

(56) References Cited

U.S. PATENT DOCUMENTS 9,870,157 B2      1/2018   Halaharivi et al.
9,971,546 B2      5/2018   Shen et al.
11,163,493 B2    11/2021   Kanno et al.
(Continued)

FOREIGN PATENT DOCUMENTS

EP          3945407 A1      2/2022

OTHER PUBLICATIONS

A screen shot of the term 'transfer' from the Cambridge Dictionary that discloses to transfer an entitiy is to move it from one place to another. (Year: 2019).*

*Primary Examiner* — Janice M. Girouard
(74) *Attorney, Agent, or Firm* — Renaissance IP Law Group LLP

(57) ABSTRACT

In some aspects, the techniques described herein relate to a method including receiving, from a host device, a first request to write first data to a memory device; adding the first request to a queue on the memory device; determining an availability of a write buffer of the memory device; retrieving the first data from the host device based on the determining and the first request added to the queue; and writing the first data to a write buffer of the memory device. The method may further include returning a completion message to the host device based on writing the first data to the write buffer; and writing the first data from the write buffer of the memory device to storage media. The first request may be an SQE, and the method may further include parsing the SQE and determining that the SQE is a write command.

20 Claims, 5 Drawing Sheets

(56)    References Cited

U.S. PATENT DOCUMENTS

| 11,372,782 | B2 | | 6/2022 | Kim et al. | |
| 11,392,297 | B2 | | 7/2022 | Yang et al. | |
| 11,461,238 | B2 | | 10/2022 | Jang | |
| 2020/0050403 | A1 | * | 2/2020 | Suri | G06F 3/0665 |
| 2020/0089537 | A1 | * | 3/2020 | Bahirat | G06F 9/468 |
| 2021/0081115 | A1 | * | 3/2021 | Clarke | G06F 3/0659 |
| 2021/0374060 | A1 | * | 12/2021 | Subbarao | G06F 3/0656 |
| 2022/0229596 | A1 | | 7/2022 | Jung | |
| 2024/0319913 | A1 | * | 9/2024 | Akavaram | G06F 3/061 |

* cited by examiner

SYSTEMS, METHODS, AND APPARATUS FOR USING A SUBMISSION QUEUE FOR WRITE BUFFER UTILIZATION

REFERENCE TO RELATED APPLICATION

This application claims priority to, and the benefit of, U.S. Provisional Patent Application Ser. No. 63/467,917, filed on May 19, 2023, which is incorporated by reference.

TECHNICAL FIELD

This disclosure relates generally to storage devices, and more specifically to systems, methods, and apparatus to improve write buffer utilization on storage devices.

BACKGROUND

Generally, a storage device may include a write buffer that interacts with a host to allow writing to storage media on the storage device. The host can pass a write request to the storage device, which may be written to a write buffer. The data from the write buffer may be written to the storage media and a completion message can be returned to the host indicating that the data has been written to the storage device.

The above information disclosed in this Background section is only for enhancement of understanding of the background of the invention and therefore it may contain information that does not constitute prior art.

SUMMARY

In some aspects, the descriptions herein relate to a method including: receiving, from a host device, a first request to write first data to a memory device; adding the first request to a queue on the memory device; determining an availability of a write buffer of the memory device; retrieving the first data from the host device based on the determining and the first request added to the queue; and writing the first data to a write buffer of the memory device. The method may further include returning a completion message to the host device based on writing the first data to the write buffer; and writing the first data from the write buffer of the memory device to storage media. The first request may be an SQE, and the method may further include parsing the SQE and determining that the SQE is a write command. The method may further include parsing a reclaim group (RG) and reclaim unit handle (RUH) from the SQE; and adding the first request to a queue may include queueing the SQE in a first in first out (FIFO) queue, wherein the FIFO queue corresponds to the RG and the RUH. Adding the first request to a queue may include determining that a size of data in the write buffer is above a threshold value; and adding the first data to the queue. Determining an availability of a write buffer may include determining that the size of data in the write buffer is below the threshold value; and writing the first data to a write buffer may include writing the first data from the queue to the write buffer; and removing the first data from the queue. The queue may include a first indicator, wherein the first indicator may correspond to a location in a host memory of the host device, wherein the location in the host memory corresponds to the first data. The method may further include receiving, from a host device, a second request to read second data from the memory device; and retrieving the second data from the memory device; wherein the write buffer is above a threshold value. The method may further include receiving, from a host device, a second request to write second data to the memory device; and adding the second request to the queue on the memory device. The method may further include a second indicator, wherein the second indicator corresponds to a most recent first request.

In some aspects, the descriptions herein relate to a device including a controller, where the controller includes a write buffer; storage media; and a queue; and where the controller performs operations including receiving, from a host device, a first request to write first data to the storage media; adding the first request to the queue, where the queue is a FIFO queue; retrieving the first data from the host device based on the first request; determining an availability of a write buffer of the memory device; retrieving the first data from the host device based on the determining and the first request added to the queue; writing the first data to the write buffer; returning a completion message to the host device; and writing the first data from the write buffer to the storage media. The first request may be an SQE, the completion message may be a completion queue entry (CQE), and the controller may further perform operations including parsing the SQE and determining that the SQE is a write request. Parsing the SQE may include parsing an RG and RUH from the SQE, where the queue corresponds to the RG and the RUH. Adding the first request to a queue may include determining that a size of data in the write buffer is above a threshold value, and adding the first data to the queue. Writing the first data to a write buffer may include determining that the size of data in the write buffer is below the threshold value, writing the first data from the queue to the write buffer, and removing the first data from the queue. The controller may perform operations including receiving, from the host device, a second request to write second data to the storage media and adding the second request to the queue, and writing the first data to a write buffer may include determining that a size of data in the write buffer is below a threshold value, writing the first data from the queue to the write buffer, and writing second data from the queue to the write buffer. The queue may include a first indicator, where the first indicator corresponds to a location in a host memory of the host device, and the location in the host memory corresponds to the first data.

In some aspects, the descriptions herein relate to a system including a host device; and a storage device, where the storage device includes a controller, where the controller includes a write buffer; storage media; and a queue; where the controller may perform operations including receiving, from the host device, a first request to write first data to the storage media; adding the first request to the queue, where the queue is a FIFO queue; determining an availability of a write buffer of the memory device; retrieving the first data from the host device based on the determining and the first request added to the queue; writing the first data to the write buffer; returning a completion message to the host device; and writing the first data from the write buffer to the storage media. Adding the first request to a queue may include determining that a size of data in the write buffer is above a threshold value, and adding the first request to the queue. Writing the first data to a write buffer may include determining that the size of data in the write buffer is below the threshold value, writing the first data from the queue to the write buffer, and removing the first data from the queue.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
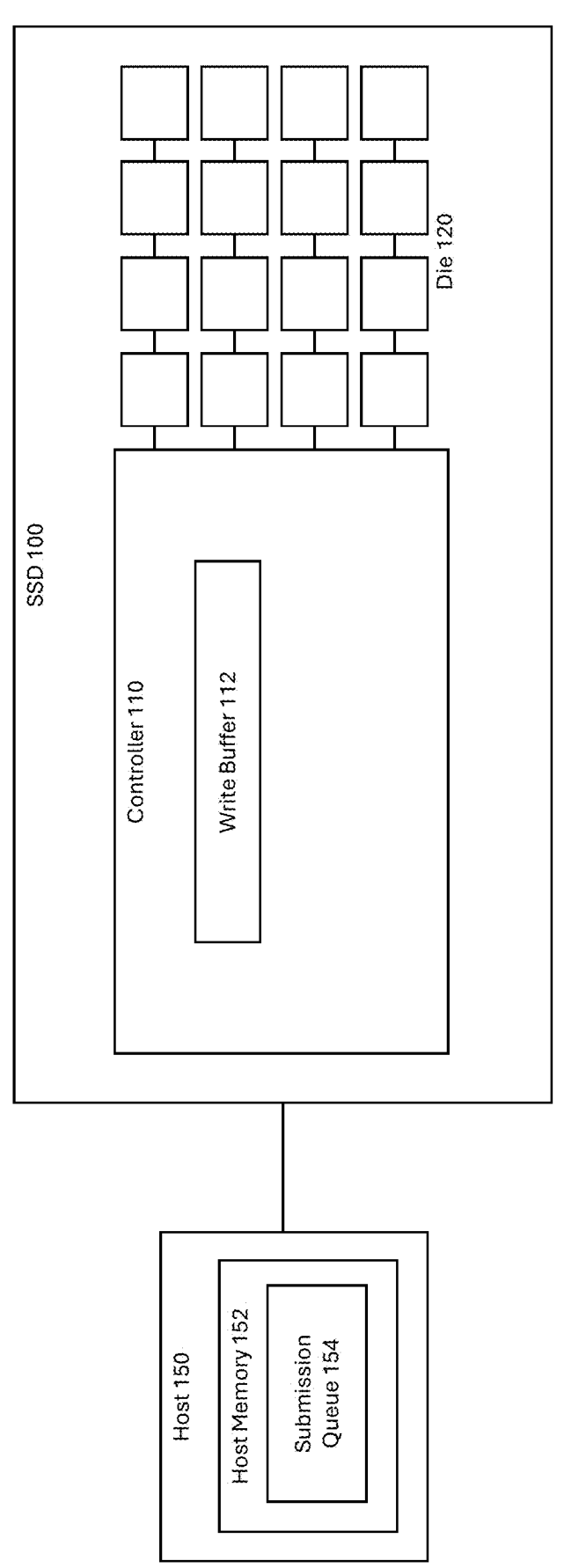
FIG. 1 illustrates an example of a storage device using a write buffer in accordance with example embodiments of the disclosure.

Generally, a storage device may be organized into blocks, and each block may contain one or more pages. In some embodiments, data may be written to and read from the storage device in pages, and be erased in blocks. In some embodiments, as data is deleted from the storage device, the data on the block may not be erased. For example, a solid state drive (SSD) may delete the reference to the data on the block, while the data remains on the block until an erase operation occurs.

In some embodiments, when data is to be written to the storage device, the data may need to be written to an empty block. For example, in an SSD, all cells on a block may need to be set to zero before data may be written to the block. However, if there is data still being used on the block, the data may need to be moved from the block before new data may be written to the block. Otherwise, the data on the block may be overwritten when a new write operation is performed on the block. Thus, the existing data on the block may need to be written to temporary storage. When the data is moved to temporary storage, the block may be erased since the data is located at the temporary storage. The data that was written to temporary storage may then be written back to a free block.

In some embodiments, the host may control which logical blocks are written to a set of blocks managed by the SSD called a reclaim unit (RU). For example, the host may use a reclaim unit handle (RUH) that points to an RU in the SSD. In particular, an RUH may allow the SSD to manage and buffer the logical blocks to write to an RU. In some embodiments, the host may act on the RUH to write to a corresponding RU, allowing the host to isolate the data written to the RU per application or even within an application to separate data written that has different life cycles (e.g., hot and cold data). In some embodiments, a reclaim group (RG) may be a collection of RUs. In some embodiments, a storage device may have a write buffer for each RG/RUH combination.

In some embodiments, a storage device may use a write buffer to write data to the storage media. However, in some embodiments, the write buffer may be unable to write to the storage media, e.g., if the storage media is in use or other data is being written to the storage media. In some embodiments, if the data from the write buffer is not being written to the storage media, a completion queue entry (CQE) may not be sent to the host, and the write buffer may not process another submission queue entry (SQE) until the CQE is sent. Furthermore, in some embodiments, if a write buffer needs to wait for write data while other write buffers are being used, that write buffer may be underutilized.

According to embodiments of the disclosure, by utilizing queues for the write requests to populate the write buffer, the write buffer may be better utilized since the storage device can receive more requests while the queue waits until the write buffer is able to handle additional write data transfers from the host.

FIG. 1 illustrates an example of a storage device using a write buffer in accordance with example embodiments of the disclosure. In the example shown in FIG. 1, the storage device includes an SSD 100. The SSD 100 in FIG. 1 includes a controller 110 and storage media, e.g., die 120. The controller 110 includes a write buffer 112. In some embodiments, a write SQE (e.g., a request to write data to the memory device) may be received from a host 150 by the controller 110. The host 150 in FIG. 1 includes a host memory 152 and the host memory 152 includes a submission queue 154. In some embodiments, the submission queue 154 may contain an entry (e.g., SQE) from the host 150 to write data to the SSD 100. In some embodiments, the SQE may be read from the submission queue 154 and sent to the SSD 100. In some embodiments, the controller 110 may read and parse the SQE to determine whether the SQE is a write request. In some embodiments, if the SQE is a write request, data may be transferred to the write buffer 112. In some embodiments, the controller 110 may complete the write request by returning a CQE to the host 150. In some embodiments, the controller 110 may also program the data in the write buffer 112 to the storage media, e.g., die 120.

In some embodiments, the aforementioned process may assume that the controller 110 selects the location for the data storage, and enable a compact ordered filing of the storage media. An issue with the described process of FIG. 1 is there may be one RG per die, and all commands may go to the single RG. Additionally, the write buffer 112 may fill because one die becomes busy. Thus, in some embodiments, read commands submitted to the submission queue 154 may be blocked, as well as write commands to another die (e.g., another RG).

Figure 2:
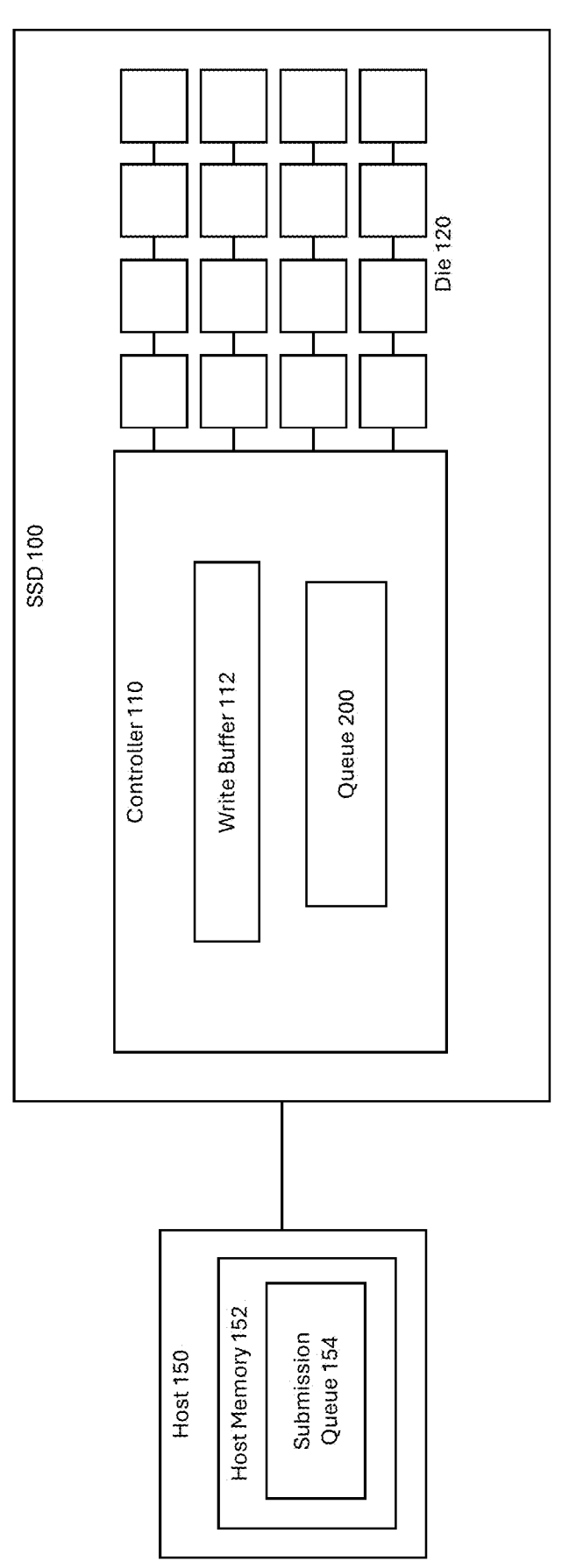
FIG. 2 illustrates another example of a storage device using a write buffer in accordance with example embodiments of the disclosure.
Figure 3:
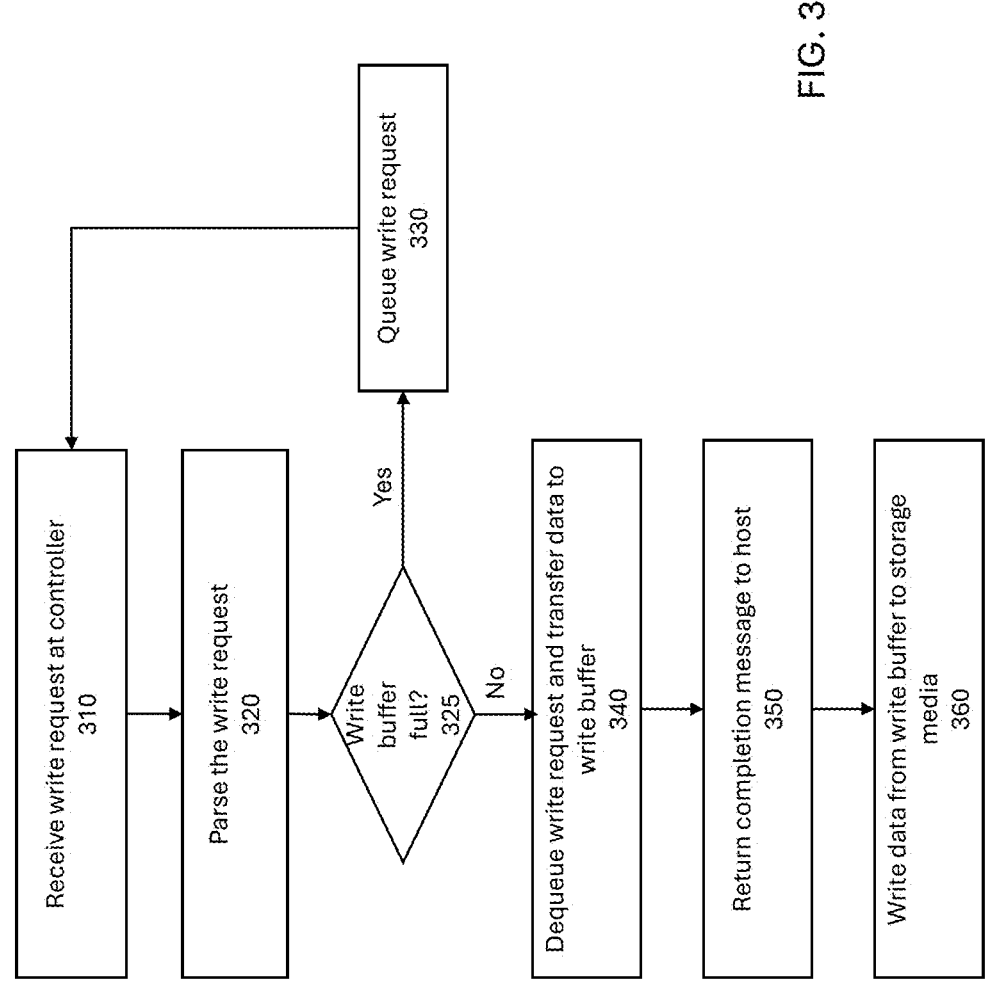
FIG. 3 illustrates a method for populating the storage media in accordance with example embodiments of the disclosure.

FIG. 2 illustrates another example of a storage device using a write buffer in accordance with example embodiments of the disclosure. Like numerals are used for like parts in FIG. 2. FIG. 2 further includes a queue 200. The queue 200 is included in the controller 110. The controller 110 may use the queue 200 to receive write requests from the host 150 instead of transferring the data from the SQE to the write buffer 112. Further description of the queue 200 is detailed below. FIG. 3 illustrates a method for populating the storage media in accordance with example embodiments of the disclosure. Further description will be made with reference to FIGS. 2 and 3.

At 310, a request is received at the controller 110 from the host 150. For example, in some embodiments, the host 150 may send a request (e.g., SQE), which is received at the controller 110. In some embodiments, the SQE may be a write request (e.g., a request to write data from the host 150 to the SSD 100). It should be understood that the SQE need not come from a host and may come from another source, e.g., the SSD itself or another SSD. Furthermore, in some embodiments, a SQE need not be received and another type of request to write data to the SSD may be received from the SSD.

At 320, the request is parsed. For example, in some embodiments, the controller 110 may determine if the request is a write request. In some embodiments, if the request is a write request, the controller 110 may determine that the write request should be written to memory. In some embodiments, an RG and RUH may be parsed from the write request. In some embodiments, the RG and RUH may correspond to a write buffer 112. Furthermore, in some embodiments, the write buffer need not correspond to an RG or RUH and may correspond to any logical partitioning of the storage media.

At 325, the SSD 100 determines whether the write buffer 112 is full. For example, in some embodiments, the controller 110 may determine whether the size of the data in the write buffer 112 is above a threshold value. The threshold may be the size of a programming unit (e.g. a word line (WL) of one erase block (EB), one WL of one EB from every plane of a die, one WL of one EB of every die within the RG, etc.) or some other size. For example, the size of the write buffer 112 may be proportional to the size of the RG. In some embodiments, the amount of data in the write buffer may not be compared to a threshold value and some other method to determine when to write data to the write buffer may be used. For example, the SSD may use artificial intelligence to determine when a write buffer is full and/or size of data to be written.

At 330, when the write buffer 112 is full, the write request is queued. For example, the controller 110 may queue the write request in the queue 200 and then process additional commands. For example, the method may return to 310. When the controller 110 receives another write request, it may parse the write request (e.g., go to 320) and determine if the write buffer 112 is full (e.g., go to 325). In some embodiments, when the write buffer 112 is not full, the data from the write request may be transferred to the write buffer 112.

At 340, when the write buffer 112 is not full, a write request is dequeued from the queue 200 (e.g., the write request may be removed from the queue), and data may be transferred to the write buffer 112. For example, if the write buffer 112 is not full (e.g., a prior write request's data was in the write buffer 112 and written to the die 120), a next write request may be taken from the queue 200 and may be added to the write buffer 112. In some embodiments, the queue 200 may be a first in first out (FIFO) queue, so that the earliest data is handled first. This may allow for the write buffer 112 to handle requests in the order they are received instead of a request being handled by the controller 110. Thus, in some embodiments, write requests may be received from the host 150 without waiting for the write buffer 112 to free up space for more write requests. In some embodiments, if there are no write requests in the queue 200, the write request from the host 150 may be written to the write buffer 112.

In some embodiments, all write requests may be added to the queue 200, and the write request from the host 150 may be written to the write buffer 112 when the write buffer 112 is no longer full.

At 350, a completion message (e.g., CQE) is returned to the host. In some embodiments, the host may free up memory on the host device. For example, the host may save the write data, for example, in host memory, until it receives the CQE. Thus, the write data can be retrieved at any time the host memory retains the data. In some embodiments, the host may free up the memory in host data after the data is written to the write buffer 112.

At 360, the data from the write buffer is written to the storage media (e.g., the die 120). In some embodiments, writing data to the storage media may be a background process. In some embodiments, a write operation on the storage device may include adding error correction codes (ECC) to the data, transferring the data and ECC to the NAND, programming the NAND, verifying the programming of the NAND, and any error handling on any step above. It should be understood that the storage device need not perform all of the steps above and may perform some or one of the steps described above. For example, if the storage device does not have ECC, that step may not be performed.

In some embodiments, the write buffer may write a page of data to the storage media. media (e.g., the die 120). In some embodiments, the write buffer may write a word line (WL) or super word line of data to the storage media. media (e.g., the die 120). For example, a WL may be 4 pages in a quad-level cell (QLC) SSD or 3 pages in a triple-level cell (TLC) SSD. In some embodiments, a size of a read may be a page and the size of a write may be a WL. It should be understood that a size of a write operation need not be a page or WL and may be some other size determined by the storage device. For example, a storage device may write multiple WLs for each write operation. In some embodiments a super block (SB) may be an EB from every plane of every die. For example, if the SSD has 16 dies as shown in FIG. 1, and each die has 4 planes, then the storage device may have 64 EBs total. In some embodiments, an RU may be equal to a SB, a proportion of a SB, a multiple of the SB, or some other equivalence to an SB.

Although at 325, whether the write controller is full is determined, this step need not occur in that order. For example, the data may first be sent to the FIFO queue 200 (e.g., at 330). The controller 110 may then determine if the write buffer 112 is full. If the write buffer 112 is not full, the controller 110 may take the write request from the queue 200 and write the data to the write buffer 112. In some embodiments, the data received from the host (e.g., the data from the SQE), may be continuously written to the FIFO queue 200.

Figure 4:
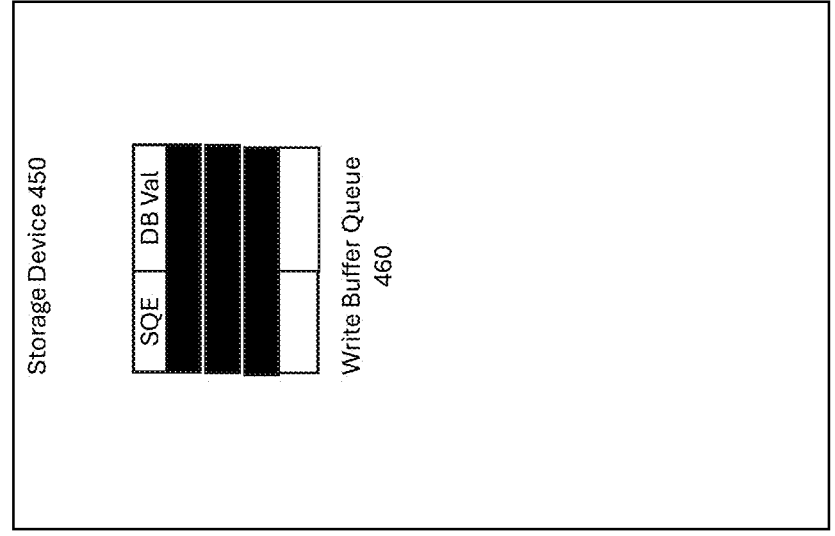
FIG. 4 illustrates an example operating environment for a host device sending write requests to a storage device in accordance with example embodiments of the disclosure.
Figure 4:
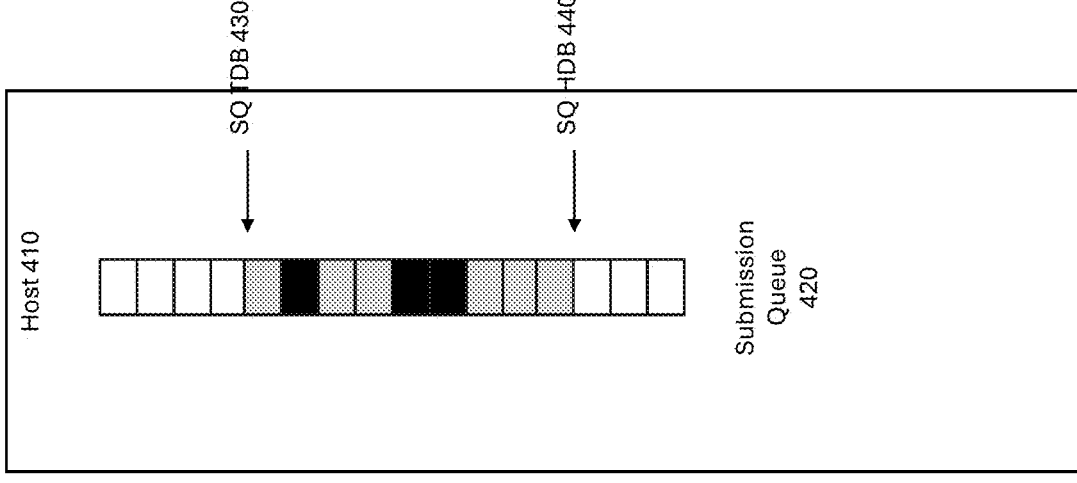
Figure 5:
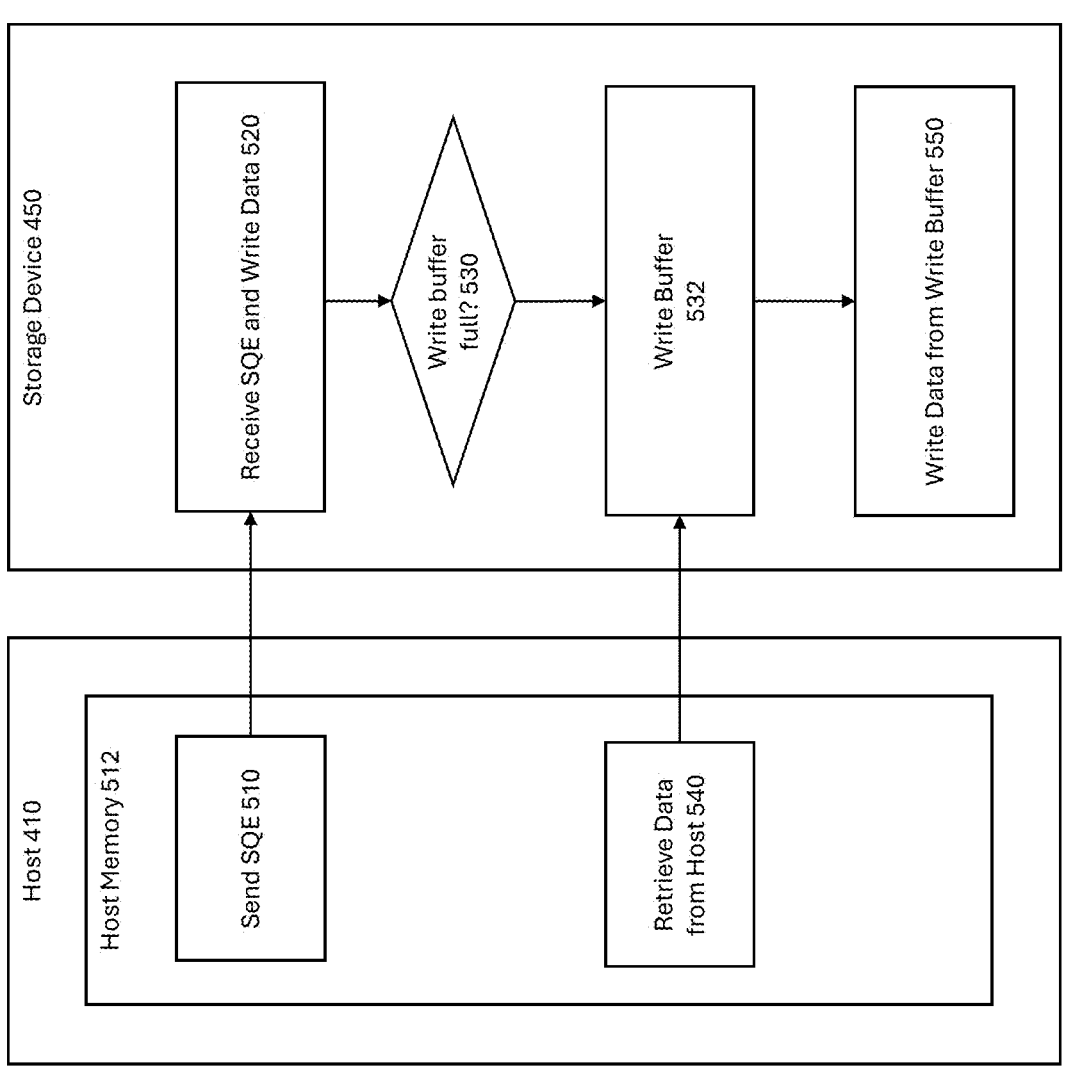
FIG. 5 illustrates a flowchart of an example procedure for populating the storage media in accordance with example embodiments of the disclosure.

FIG. 4 illustrates an example operating environment for a host device sending write requests to a storage device in accordance with example embodiments of the disclosure. FIG. 4 includes a host 410 and storage device 450. The host 410 may be the host 150 in FIG. 1 or may be some other host. In addition, the storage device 450 may be the SSD 100 in FIG. 1 or some other storage device. The host 410 includes a submission queue 420. The submission queue 420 includes a first indicator (e.g., SQ TDB 430) and a second indicator (e.g., SQ HDB 440). The storage device 450 includes a write buffer queue 460. FIG. 5 illustrates a flowchart of an example procedure for populating the storage media in accordance with example embodiments of the disclosure. Further description will be made with reference to FIGS. 4 and 5.

In some embodiments, at 510, an SQE is sent from a submission queue 420 on a host 410. For example, the host 410 may include the submission queue 420 for the read and write requests for the storage device 450. In some embodiments, the host may use the first indicator (e.g., submission queue tail doorbell (SQ TDB) 430), which indicates which request is stored in a write buffer queue 460 of the storage device 450. For example, as the host sends the SQE from the submission queue 420, the SQ TDB 430 may be updated to the next entry in the submission queue 420. Thus, the host 410 may send the next SQE from the submission queue 420 and the SQ TDB 430 may be updated again. This step may to continue occur until the submission queue 420 is empty or the SQ TDB 430 matches the SQ HDB 440, which will be described in further detail below. In some embodiments, an entry of the write buffer queue 460 includes the SQE and a pointer to the data on the host (e.g., DB Val). Thus, each entry on the write buffer queue 460 may correspond to an entry in the submission queue 420 and a pointer to its associated data in the host memory. In some embodiments, the storage device may retrieve the SQE from the host 410.

At 520, the SQE is received by the storage device 450. In some embodiments, the SQE may be placed in the write buffer queue 460. It should be understood that the data associated with the write command in the SQE need not be placed in the queue, and the data may be placed in the write buffer if the write buffer has the space for the data from the SQE. Furthermore, in some embodiments, the SQE may be a read request which is handled by the controller and may not contend for write buffer space or be written to the queue. In some embodiments, the controller may write the SQE to a write buffer queue. In some embodiments, by writing the data to the queue, the host 410 can continue to add SQEs to the submission queue 420 instead of waiting for the data to be written (e.g., receive a CQE). Since the indicator (e.g., SQ TDB 430) indicates what data has been written to the write buffer queue 460, the write buffer queue 460 can continue to receive SQEs until it runs out of space or other criteria has been achieved.

At 530, the controller determines whether the write buffer 532 is full. For example, if the SQE is a write request, the controller may determine which write buffer corresponding to the RG and RUH of the SQE to write the data to. If the write buffer 532 is above a threshold value, the write request may remain in the write buffer queue 460. If the write buffer 532 is below the threshold value, the write buffer 532 can be populated by data 534 from the host 410 associated with a command that is pulled from the write buffer queue 460.

At 540, the controller retrieves the data from the host 410 based on the write request from the queue. For example, the SQE may indicate what data is to be sent from the host to the storage device. In some embodiments, the second indicator (e.g., submission queue head doorbell (SQ HDB) 440) may be used to indicate which commands have started to be processed by the storage device 450 (e.g., data was retrieved from the host). In some embodiments, by using indicators for SQEs that indicate which data has been written to the write buffer (e.g., SQ HDB 440) and which SQEs have been received by the write buffer queue (e.g., SQ TDB 430), the host 410 may know which data can be read and whether to continue to submit new SQEs to the storage device 450 (e.g., using CQEs from the storage device 450). In some embodiments, the storage device 450 may have a completion queue (not pictured). In some embodiments, when the data has been written to the write buffer, the storage device 450 may insert a CQE into the completion queue and the CQE may be passed to the host 410. The SQ HDB 440 may be moved to a new entry on the queue indicating that the data has been written to the write buffer. In some embodiments, moving the SQ HDB 440 may allow the host to remove the data from the host (e.g., host memory). For example, until the data has been written to the storage device 450, a copy of the data may need to reside on the host 410. Once it has been written, the host may no longer need to maintain a copy and may be removed.

In some embodiments, the write command may be long (e.g., the data to be transferred to the storage device 450 may be large). In some embodiments, the data 534 may be transferred in segments. In some embodiments, the write buffer 532 may be managed in segments. In some embodiments, the write buffer 532 may be marked for programming. For example, the write buffer 532 may be marked ready for programming, and provide the RU information to program the data 534 into the correct RU.

At 550, the data 534 is written to the storage media 552. Data need not be written immediately after the data is written to the write buffer and may be written any time. For example, the controller can determine when the write buffer has enough data to write to a WL of the storage media and write to the storage media.

In some embodiments, the write buffer queue 460 may determine whether there is data to write to a specific RU in a write buffer 532. In some embodiments, the storage device 450 may determine whether the storage media 552 (e.g., NAND die) is available for activity. In some embodiments, the storage device may wait for other programs or reads to complete. For example, if the RU is available but other locations on the NAND a busy, the storage device 450 may wait for those operations to complete before writing to the storage media 552.

In some embodiments, the storage device may continue to fetch and parse non-conflicting SQEs. For example, the storage device can still process read requests and request to other write buffers, if a particular write buffer is full. In some embodiments, as the requests are removed from the queue, the indicator for the submission queue indicating which data has been written can be updated. In some embodiments, a single write buffer may be used, and the write buffer may be partitioned. The partition may be by RG, RUH, RG/RUH combination, or other option. In some embodiments, the partitions may be static. In some embodiments, the partitions may be shared (e.g., the write buffer may use an overflow shared pool if one or more partition is temporarily unavailable).

In some embodiments, the indicator for which requests have been received by the queue may not proceed if the queue is full and the most recent fetch meets conditions for insertion to the queue.

In some embodiments, the threshold value may be set to any one of the following options: a percentage of buffer space, number of logical blocks (NLBs), or the quantity of data to program on the NAND. In some embodiments, the threshold value may be set to any value that can be used by the controller to determine whether to write data to the buffer or write the request to the queue.

In some embodiments, for each queue, the outstanding NLBs may be counted. In some embodiments, these commands may be parsed, and the write buffer may be consumed once it has enough data to fill one programming unit of the RU.

In some embodiments, an RU may be several EBs in size, and the EBs may have many WLs. In some embodiments, the storage device may store in the write buffer enough to program one WL of each of EBs in an RU. Then, the storage device may write the data from the write buffer (e.g., program that portion of data from the write buffer).

In some embodiments, the storage device may write one WL from each EB in a die to the write buffer. Then, in some embodiments, the storage device may that much data on one die so that the one die is occupied with programming. In this example, the RU may stripe across all 16 die. In some embodiments, the RU may be programmed (1 WL*4) at a time, and may occur 16 times until the process returns to the first die. In some embodiments, the storage device may program the next WL down on the EBs of that die.

In some embodiments, the write buffer may be determined to be empty after data is successfully transfer to the storage media, after a program success, or after XOR, or other data protection on the incoming data is generated.

In some embodiments, there may be one queue per partition, where there is a partition per RUH, per RG, or per RG/RUH combination. In some embodiments, there may be more than one queue per partition. For example, two different hosts may each have a queue that sends write requests to the same buffer. Furthermore, in some embodiments, there may be one queue for more than one partition.

In some embodiments, the write buffer may be managed according to the following options: a fully allocated buffer without any partitioning; a hard division per partition; some reserved per partition plus free pool for overflow; and/or a dynamic allocation set as a function of the multi-tenancy sharing requested of the SSD that may vary as a function of tenant Write Amplification or tenant performance. In some embodiments, an optional timer may be incorporated as follows. For example, a timer may be associated with the commands in the FIFO, and the commands may be pulled into the write buffer to avoid host-command timeouts.

In some embodiments, an SSD may include an internal FIFO per RG and/or RUH for Write commands. In some embodiments, the FIFO may be used to store conflicting Write SQEs with various write buffer sharing options as described herein. In some embodiments, the NLB may be counted in the FIFO to read in complete Word line (WL) programs to the NAND.

The principles disclosed herein have independent utility and may be embodied individually, and not every embodiment may utilize every principle. However, the principles may also be embodied in various combinations, some of which may amplify the benefits of the individual principles in a synergistic manner.

For purposes of illustrating the inventive principles of the disclosure, some example embodiments may be described in the context of specific implementation details such as a processing system that may implement a NUMA architecture, memory devices, and/or pools that may be connected to a processing system using an interconnect interface and/or protocol Compute Express Link (CXL), and/or the like. However, the principles are not limited to these example details and may be implemented using any other type of system architecture, interfaces, protocols, and/or the like.

Although some example embodiments may be described in the context of specific implementation details such as a processing system that may implement a NUMA architecture, memory devices, and/or pools that may be connected to a processing system using an interconnect interface and/or protocol CXL, and/or the like, the principles are not limited to these example details and may be implemented using any other type of system architecture, interfaces, protocols, and/or the like. For example, in some embodiments, one or more memory devices may be connected using any type of interface and/or protocol including Peripheral Component Interconnect Express (PCIe), Nonvolatile Memory Express (NVMe), NVMe-over-fabric (NVMe oF), Advanced extensible Interface (AXI), Ultra Path Interconnect (UPI), Ethernet, Transmission Control Protocol/Internet Protocol (TCP/

IP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, and/or the like, or any combination thereof. In some embodiments, an interconnect interface may be implemented with one or more memory semantic and/or memory coherent interfaces and/or protocols including one or more CXL protocols such as CXL.mem, CXL.io, and/or CXL.cache, Gen-Z, Coherent Accelerator Processor Interface (CAPI), Cache Coherent Interconnect for Accelerators (CCIX), and/or the like, or any combination thereof. Any of the memory devices may be implemented with one or more of any type of memory device interface including DDR, DDR2, DDR3, DDR4, DDR5, LPDDRX, Open Memory Interface (OMI), NVLink, High Bandwidth Memory (HBM), HBM2, HBM3, and/or the like.

In some embodiments, any of the memory devices, memory pools, hosts, and/or the like, or components thereof, may be implemented in any physical and/or electrical configuration and/or form factor such as a free-standing apparatus, an add-in card such as a PCIe adapter or expansion card, a plug-in device, for example, that may plug into a connector and/or slot of a server chassis (e.g., a connector on a backplane and/or a midplane of a server or other apparatus), and/or the like. In some embodiments, any of the memory devices, memory pools, hosts, and/or the like, or components thereof, may be implemented in a form factor for a storage device such as 3.5 inch, 2.5 inch, 1.8 inch, M.2, Enterprise and Data Center SSD Form Factor (EDSFF), NF1, and/or the like, using any connector configuration for the interconnect interface such as a SATA connector, SCSI connector, SAS connector, M.2 connector, U.2 connector, U.3 connector, and/or the like. Any of the devices disclosed herein may be implemented entirely or partially with, and/or used in connection with, a server chassis, server rack, dataroom, datacenter, edge datacenter, mobile edge datacenter, and/or any combinations thereof. In some embodiments, any of the memory devices, memory pools, hosts, and/or the like, or components thereof, may be implemented as a CXL Type-1 device, a CXL Type-2 device, a CXL Type-3 device, and/or the like.

In some embodiments, any of the functionality described herein, including, for example, any of the logic to implement tiering, device selection, and/or the like, may be implemented with hardware, software, or a combination thereof including combinational logic, sequential logic, one or more timers, counters, registers, and/or state machines, one or more complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), tensor processing units (TPUs) and/or the like, executing instructions stored in any type of memory, or any combination thereof. In some embodiments, one or more components may be implemented as a system-on-chip (SOC).

In this disclosure, numerous specific details are set forth in order to provide a thorough understanding of the disclosure, but the disclosed aspects may be practiced without these specific details. In other instances, well-known methods, procedures, components, and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" may include any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

The term "module" may refer to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth. Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, e.g., one or more modules of computer-program instructions, encoded on computer-storage medium for execution by, or to control the operation of data-processing apparatus. Alternatively or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

While certain exemplary embodiments have been described and shown in the accompanying drawings, it should be understood that such embodiments merely illustrative, and the scope of this disclosure is not limited to the embodiments described or illustrated herein. The invention may be modified in arrangement and detail without departing from the inventive concepts, and such changes and modifications are considered to fall within the scope of the following claims.

The invention claimed is:

1. A method comprising:
receiving, from a host device, a first request to write first data to a memory device;
determining a first availability, based on a size of data in a write buffer, of the write buffer corresponding to a location to write the first data of the memory device;
adding the first request to a queue on the memory device based on determining the first availability;
determining a second availability of the write buffer;
retrieving the first data from the host device based on adding the first request and determining the second availability; and
writing the first data to the write buffer of the memory device.

2. The method of claim 1, further comprising:
returning a completion message to the host device based on writing the first data to the write buffer; and
writing the first data from the write buffer of the memory device to storage media.

3. The method of claim 1, wherein the first request is a submission queue entry (SQE), and wherein the method further comprises:
parsing the SQE; and
determining that the SQE is a write request.

4. The method of claim 1, wherein the first request is a submission queue entry (SQE), and wherein the method further comprises:
parsing a reclaim group (RG) and reclaim unit handle (RUH) from the SQE; and wherein adding the first request to the queue comprises queueing the SQE in a first in first out (FIFO) queue, wherein the FIFO queue corresponds to the RG and the RUH.

5. The method of claim 1, wherein adding the first request to a queue comprises:
determining that the size of the data in the write buffer is above a threshold value; and
adding the first data to the queue.

6. The method of claim 1, wherein determining the first availability of the write buffer comprises determining that a size of data in the write buffer is below a threshold value; and writing the first data to the write buffer comprises:
writing the first data from the queue to the write buffer; and
removing the first data from the queue.

7. The method of claim 1, wherein the queue comprises a first indicator, wherein the first indicator corresponds to a location in a host memory of the host device, wherein the location in the host memory corresponds to the first data.

8. The method of claim 1, further comprising:
receiving, from the host device, a second request to read second data from the memory device; and
retrieving the second data from the memory device; wherein the write buffer is above a threshold value.

9. The method of claim 1, further comprising:
receiving, from the host device, a second request to write second data to the memory device; and
adding the second request to the queue on the memory device.

10. The method of claim 1, further comprising a second indicator, wherein the second indicator corresponds to a most recent first request.

11. A device comprising:
a controller, wherein the controller comprises a write buffer, wherein the write buffer corresponds to a location to write first data;
storage media; and
a queue; wherein the controller performs operations comprising:
receiving, from a host device, a first request to write the first data to the storage media;
determining a first availability, based on a size of data in the write buffer, of the write buffer;
adding the first request to the queue based on determining the first availability, wherein the queue is a FIFO queue;
determining a second availability of the write buffer;
retrieving the first data from the host device based on adding the first request and determining the second availability;
writing the first data to the write buffer;
returning a completion message to the host device; and
writing the first data from the write buffer to the storage media.

12. The device of claim 11, wherein the first request is a submission queue entry (SQE), the completion message is a completion queue entry, and wherein the controller further performs operations comprising:
parsing the SQE; and
determining that the SQE is a write command.

13. The device of claim 11, wherein the first request is a submission queue entry (SQE), and wherein the controller further performs operations comprising:
parsing a reclaim group (RG) and reclaim unit handle (RUH) from the SQE; wherein the queue corresponds to the RG and the RUH.

14. The device of claim 11, wherein adding the first request to a queue comprises:

determining that the size of the data in the write buffer is above a threshold value; and adding the first data to the queue.

15. The device of claim 11, wherein determining an availability of a write buffer comprises determining that the size of the data in the write buffer is below a threshold value; and writing the first data to a write buffer comprises:

writing the first data from the queue to the write buffer; and removing the first data from the queue.

16. The device of claim 11, wherein the controller performs operations comprising:

receiving, from the host device, a second request to write second data to the storage media;

adding the second request to the queue, and wherein writing the first data to the write buffer comprises:

determining that the size of the data in the write buffer is below a threshold value;

writing the first data from the queue to the write buffer; and writing the second data from the queue to the write buffer.

17. The device of claim 11, wherein the queue comprises a first indicator, wherein the first indicator corresponds to a location in a host memory of the host device, wherein the location in the host memory corresponds to the first data.

18. A system comprising:

a host device; and a storage device, wherein the storage device comprises:

a controller, wherein the controller comprises a write buffer, wherein the write buffer corresponds to a location to write first data;

storage media; and a queue; wherein the controller performs operations comprising:

receiving, from the host device, a first request to write the first data to the storage media;

determining a first availability, based on a size of data in the write buffer, of the write buffer;

adding the first request to the queue based on determining the first availability, wherein the queue is a FIFO queue;

determining a second availability of the write buffer;

retrieving the first data from the host device based adding the first request and determining the second availability;

writing the first data to the write buffer;

returning a completion message to the host device; and writing the first data from the write buffer to the storage media.

19. The system of claim 18, wherein adding the first request to a queue comprises:

determining that the size of the data in the write buffer is above a threshold value; and adding the first data to the queue.

20. The system of claim 18, wherein determining an availability of the write buffer comprises determining that the size of the data in the write buffer is below a threshold value; and writing the first data to a write buffer comprises:

writing the first data from the queue to the write buffer; and removing the first data from the queue.

* * * * *